United States Patent
Maeda et al.

(10) Patent No.: US 8,096,844 B2
(45) Date of Patent: Jan. 17, 2012

(54) ENGINE CONTROL SYSTEM FOR JET-PROPULSION BOAT, JET-PROPULSION BOAT INCORPORATING SAME, AND METHOD OF USING SAME

(75) Inventors: Hiroshi Maeda, Saitama (JP); Makoto Tsuyuguchi, Saitama (JP); Junji Higashiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 12/378,379

(22) Filed: Feb. 13, 2009

(65) Prior Publication Data

US 2009/0247029 A1   Oct. 1, 2009

(30) Foreign Application Priority Data

Mar. 28, 2008   (JP) ................................. 2008-086951

(51) Int. Cl.
*B60W 10/04* (2006.01)
*B63H 21/21* (2006.01)

(52) U.S. Cl. ........................................................ 440/87

(58) Field of Classification Search .................. 440/1, 3, 440/87; 701/21
See application file for complete search history.

(56) References Cited

U.S. PATENT DOCUMENTS

| | | | | | |
|---|---|---|---|---|---|
| 4,255,789 | A | * | 3/1981 | Hartford et al. | 701/108 |
| 4,266,274 | A | * | 5/1981 | Barman | 701/108 |
| 6,551,152 | B2 | * | 4/2003 | Matsuda et al. | 440/1 |
| 6,568,968 | B2 | * | 5/2003 | Matsuda | 440/87 |
| 7,273,033 | B2 | * | 9/2007 | Kinoshita | 123/339.11 |
| 7,744,433 | B2 | * | 6/2010 | Ozaki et al. | 440/1 |

FOREIGN PATENT DOCUMENTS

| | | |
|---|---|---|
| JP | 10-141105 | 5/1998 |
| JP | 2004-324483 | 11/2004 |

* cited by examiner

*Primary Examiner* — Daniel Venne
(74) *Attorney, Agent, or Firm* — Carrier Blackman & Associates, P.C.; Joseph P. Carrier; William D. Blackman

(57) ABSTRACT

An engine control system, for controlling an engine of a jet-propulsion boat, includes a cavitation-control-mode determination unit, which starts a cavitation-control mode when an engine speed not faster than 3200 rpm is maintained for a predetermined time period. During a normal sailing operation, ignition timing is set by a first ignition-timing setting unit. Upon detection of a cavitation-control-mode by the cavitation-control-mode determination unit, an engine speed is raised up to a speed not slower than 3200 rpm, which makes an ignition-timing switching unit to select a second ignition-timing setting unit. The second ignition-timing setting unit retards the ignition timing for the normal sailing operation when the engine speed becomes 6500 rpm or faster. In addition to retardation of the ignition timing, a boost pressure control command upper-limit value is switched to a value at a startup operation, which is less than a value at the normal sailing operation.

20 Claims, 6 Drawing Sheets

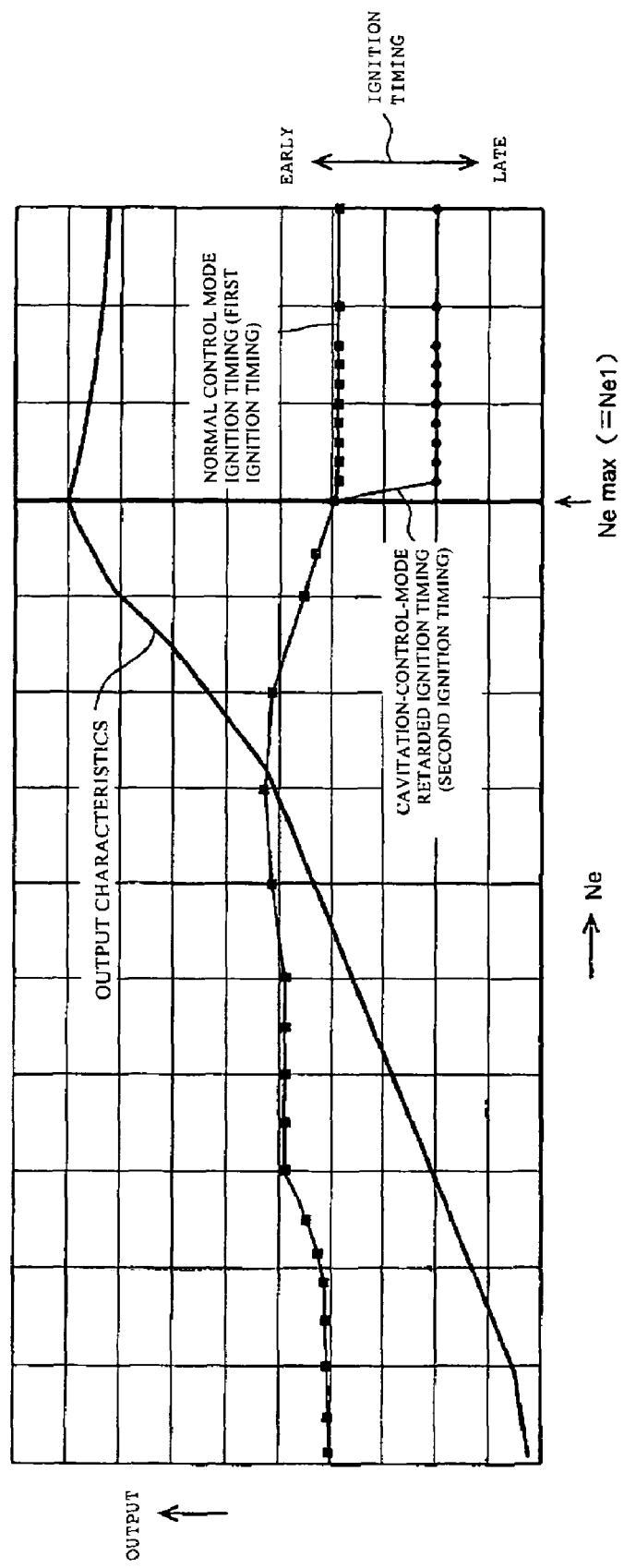

ENGINE CONTROL SYSTEM FOR JET-PROPULSION BOAT, JET-PROPULSION BOAT INCORPORATING SAME, AND METHOD OF USING SAME

CROSS-REFERENCE TO RELATED APPLICATIONS

The present invention claims priority under 35 USC 119 based on Japanese patent application No. 2008-086951, filed on Mar. 28, 2008. The entire subject matter of this priority document, including specification, claims and drawings, is incorporated by reference herein.

BACKGROUND OF THE INVENTION

1. Field of the Invention

The present invention relates to an engine control system for a jet-propulsion boat, to a jet-propulsion boat incorporating the engine control system, and to a method of using the engine control system. More particularly, the present invention relates to an engine control system for a jet-propulsion boat, which is capable of preventing cavitation regardless of whether the engine of the jet-propulsion boat is provided with a forced-induction system.

2. Description of the Background Art

A boat which is commonly known as a "jet-propulsion boat" is propelled by a reaction force produced when a jet of water that has been pressurized and accelerated by a water-jet pump is ejected from a jet-out port provided at a rear portion of the water-jet pump. A jet-propulsion boat causes cavitation due to its own characteristics. Specifically, in a case where the jet-propulsion boat sails slowly or tows a load, a rapid acceleration of an engine by opening a throttle valve of the engine at a large opening results in a situation where the speed of the vessel cannot catch up with the rapid acceleration of the engine.

In this situation, the jet pump cannot take a sufficient amount of water, and thus the pump load becomes excessively small, which results in an occurrence of a cavitation. With the an occurrence of a cavitation, the engine accelerates nearly up to the upper-limit engine speed, which in turn activates a limiter in order to decelerate the engine speed.

When the engine speed slows down to a target speed or slower, the engine starts to accelerate again. As the acceleration and the deceleration of the engine speed are repeated, the speed of the vessel is raised up to a level that is fast enough to make equilibrium between the amount of water taken into the pump and the output of the engine. Such equilibrium makes the engine speed stable. Due to an occurrence of cavitation, engine-speed hunting occurs until the engine speed becomes stabilized, and thereby the acceleration of the jet-propulsion boat is hindered at its startup.

For dealing with such drawbacks, e.g., an occurrence of a cavitation, the Japanese Patent Application Publication No. 2004-324483 discloses an engine control system for a jet-propulsion boat. When the acceleration of the engine speed reaches at a predetermined rate or higher, the engine control system according to the Japanese Patent Application Publication No. 2004-324483, retards rising of a boost pressure of a turbocharger (forced-induction system), and thereby holds down the acceleration of the engine speed.

In addition, the Japanese Patent Application Publication No. Hei 10-141105 discloses a traction-control system which controls a skid of a driving wheel by reducing a driving power of an engine when the driving wheel skids and when the vehicle is running. The traction control system includes a sensor for detecting a rotary speed of a gear in a transmission unit. The traction control system also includes ignition-timing control means for retarding an ignition timing of the engine when a rate of rising of the rotary speed of the gear detected by the sensor exceeds a predetermined rate.

The engine control system for a jet-propulsion boat disclosed in the Japanese Patent Application Publication No. 2004-324483 is a system to control the boost pressure of the forced-induction system, and therefore, is not applicable to an engine with no forced-induction system.

The traction control system as disclosed in the Japanese Patent Application Publication No. Hei 10-141105, is designed to control the engine speed, and to reduce the output of the engine based on the rising rate of the rotary speed of the gear. Accordingly, the traction control system thus configured is not suitable for controlling an engine of a jet-propulsion boat in which an impeller of the boat is directly connected to an output shaft of the engine. In addition, the system disclosed in the Japanese Patent Application Publication No. Hei 10-141105 is not supposed to be used for the purpose of preventing the cavitation that is likely to occur when the boat is starting.

The present invention has been made to overcome such drawbacks of the existing engine control system for a jet propulsion engine. Accordingly, it is one of the objects of the present invention to provide an engine control system for a jet-propulsion boat, which is capable of preventing an occurrence of cavitation regardless of whether the engine of the jet-propulsion boat is provided with a forced-induction system.

SUMMARY OF THE INVENTION

In order to achieve the above objects, the present invention according to a first aspect thereof provides an engine control system for a jet-propulsion boat. The engine control system for a jet-propulsion boat includes a first ignition-timing setting unit for setting an engine ignition timing for normal sailing operation of the jet-propulsion boat; and a second ignition-timing setting unit for setting an engine ignition timing at a retarded timing for starting of the jet-propulsion boat when an engine speed is greater than or equal to a first engine speed.

The engine control system further includes a start-preparation detection unit for detecting an engine state in which the engine speed is maintained for a first predetermined time period or longer at a speed less than or equal to a second engine speed that is slower than the first engine speed; and an ignition-timing switching unit for switching an engine ignition timing from the engine ignition timing set by the first ignition-timing setting unit to the engine ignition timing set by the second ignition-timing setting unit, when the engine speed rises up to a speed greater than or equal to the second engine speed after detection of said engine state by the start-preparation detection unit.

The present invention according to a second aspect thereof provides the engine control system for a jet-propulsion boat, in which the ignition-timing switching unit is configured to switch the engine ignition timing before completion of a predetermined time period after detection of the engine state by the start-preparation detection unit.

The present invention according to a third aspect thereof provides the engine control system for a jet-propulsion boat, in which the first engine speed is greater than or equal to an engine speed at which a maximum engine output is generated.

The present invention according to a fourth aspect thereof provides the engine control system for a jet-propulsion boat including a forced-induction system and a boost pressure control valve both arranged in an exhaust system of the engine.

When the ignition-timing switching unit switches the setting of the engine ignition timing to the engine ignition timing set by the second ignition-timing setting unit, a boost pressure control-command upper-limit value for opening the boost pressure control valve is set at a value that is smaller than a value for the normal sailing operation.

EFFECTS OF THE INVENTION

According to the first aspect of the present invention, a state in which the engine speed is kept within a low-speed range (less than or equal to the second engine speed) for a predetermined time period, is detected as the start-preparation state. When the engine speed accelerates rapidly in this state, it is determined that cavitation may possibly occur, and the engine ignition timing is retarded to lower the engine output.

The cavitation that would otherwise occur at startup operation of the jet-propulsion boat can be prevented by retarding the ignition timing when such rapid acceleration is detected after a detection of the preparation for starting operation of the engine.

According to the second aspect of the present invention, the retarding is allowed only within a limited period of time. Therefore, the retarding of the ignition timing is not executed until the speed of the jet-propulsion boat rises up to a speed fast enough that cavitation does not occur. The engine output can be therefore restored to a desired state without the retarding.

According to the third aspect of the present invention, the retarding of the ignition timing is not executed until the engine output reaches the maximum value. Therefore, while the engine speed is low enough to make the occurrence of cavitation unlikely, the engine output is not lowered down.

According to the fourth aspect of the present invention, the boost pressure control-command upper-limit value is set at a value that is less than the value for the normal sailing operation. Accordingly, the rising of the boost pressure can be reduced. Such setting combined with the retarding of the ignition timing can achieve the prevention of occurrence of cavitation.

It may be noted that, through the boost pressure control-command upper-limit value is less than in the case of the normal sailing operation, the engine output is lowered down by the retarding of the ignition timing. Accordingly, the boost pressure control-command upper-limit value can be set at a value that is higher than a value in a conventional case.

For this reason, when a predetermined time period has passed and the ignition timing is returned from the retarded state to the advanced state, the engine speed is fast and the actual boost pressure is made relatively high by the relatively-high boost pressure control-command upper-limit value.

Accordingly, favorable acceleration performance after the starting operation can be achieved. In addition, when the actual boost pressure is relatively high, and when the turbine of the forced-induction system rotates at a fast speed, the actual boost pressure is higher than the target boost pressure. As a result, the actual boost pressure can be raised up to the target boost pressure without experiencing any delay (a turbo lag).

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 6 is a chart illustrating a relationship between an engine output and ignition timing under a cavitation-control mode according to the illustrative embodiment of the present invention.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An embodiment of the present invention is described below with reference to the drawings.

Figure 2:
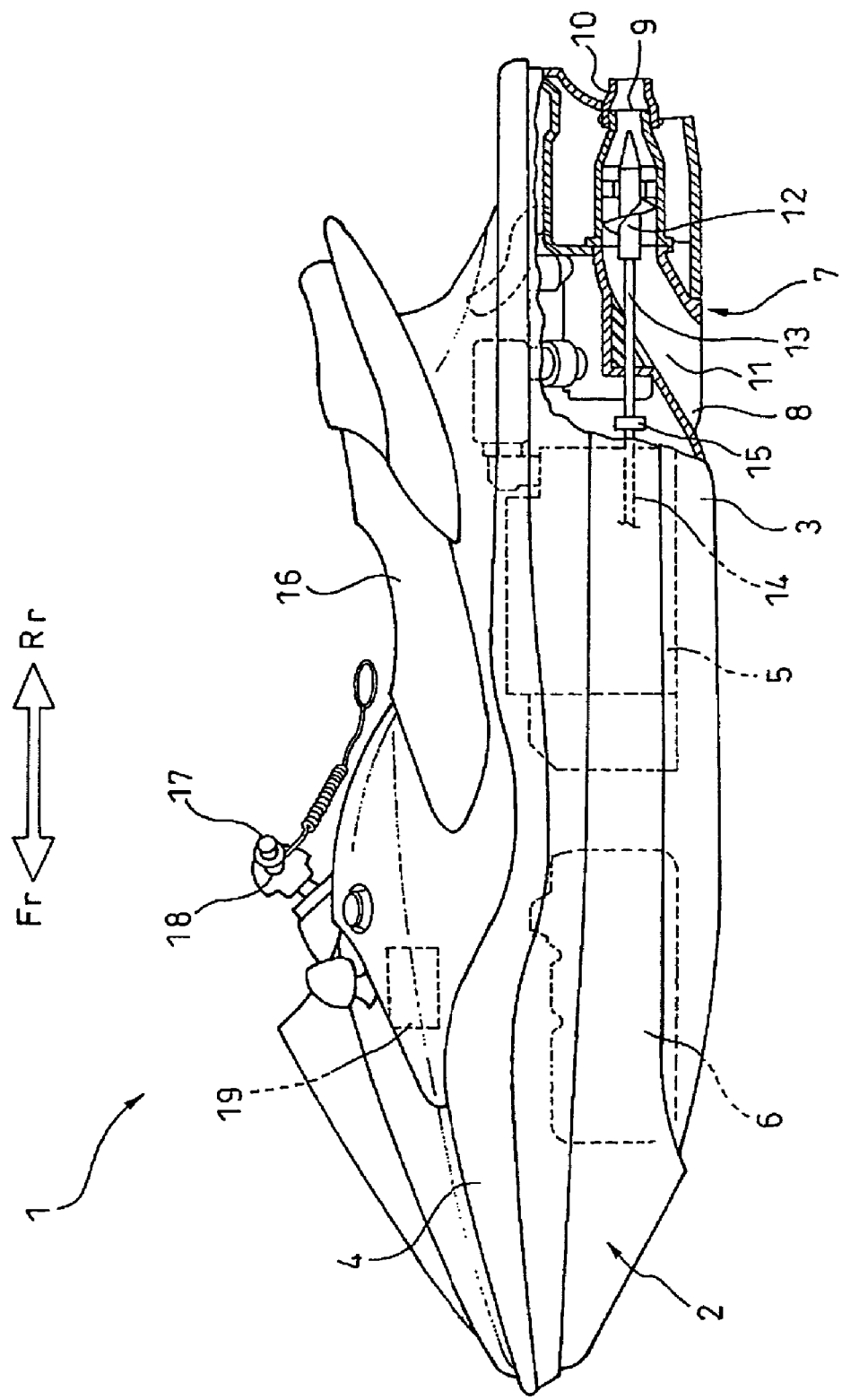
FIG. 2 is a side view of a jet-propulsion boat equipped with the engine control system according to the illustrative embodiment of the present invention.

FIG. 2 is a partially-cutaway side elevation diagram of a jet-propulsion boat equipped with an engine control system according to the illustrative embodiment of the present invention. In FIG. 2, Fr indicates the front side of the jet-propulsion boat while Rr indicates the rear side of the jet-propulsion boat.

A jet-propulsion boat 1 is a saddle-ride type small water craft. A vessel body 2 of the jet-propulsion boat 1 has a floating body structure with a hull 3 and a deck 4 coupled to each other to form a space therein. Inside the space, an engine 5 and a fuel tank 6 are mounted on the hull 3, and a water-jet pump 7 serving as a propelling unit driven by the engine 5 is provided at a rear portion of the hull 3.

The water-jet pump 7 includes a duct 11 extending from a water-inlet port 8 opening at a bottom portion of the vessel body 2 to a deflector (steering nozzle) 10 via the jet-out port 9 opening in the rear end of the vessel body 2. An impeller 12 is disposed inside the duct 11. The impeller 12 has a drive shaft 13 coupled with an output shaft 14 of the engine 5 via a coupler 15 interposed therebetween. Accordingly, when the engine 5 drives the impeller 12 to rotate, water is taken in from the water-inlet port 8 and then ejected from the deflector 10 via the jet-out port 9. As a consequence, the vessel body 2 is propelled.

A seat 16 that allows a rider to sit astride is provided on the deck 4. A steering handlebar 18 provided with a throttle lever 17 is arranged at a front side of the seat 16. The throttle lever 17 is used to change the opening degree of a throttle valve (not shown), thereby adjusting the driving revolutions of the engine 5, that is, a propulsion power generated by the water-jet pump 7.

The deflector 10 is linked to the steering handlebar 18 by an operation wire (not shown). Having such structure, the deflector 10 is moved rotationally by the operation of the steering handlebar 18, and thus changes the direction in which the vessel is headed.

An electronic control unit (ECU) 19 is disposed at a position located on a front side of the vessel body 2 and near the steering handle 18. The ECU 19 controls the engine 5, a forced-induction system (described later), and the like.

Figure 3:
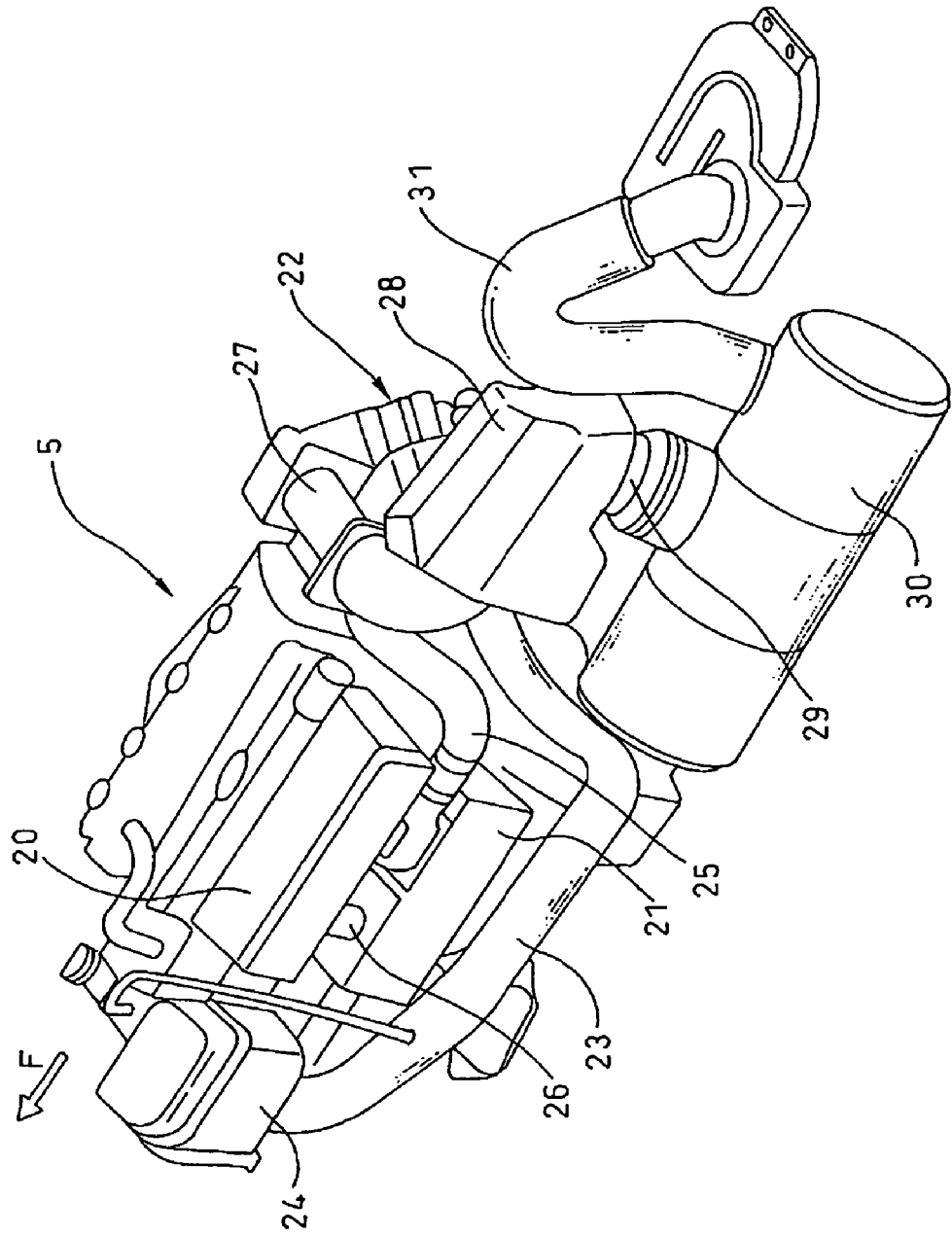
FIG. 3 is a perspective view illustrating an engine of the jet-propulsion boat equipped with the engine control system according to the illustrative embodiment of the present invention.

FIG. 3 is a perspective view of the engine 5. The engine 5 is a DOHC in-line four-cylinder dry-sump four-cycle engine. The engine 5 is mounted such that its crankshaft (the output shaft 14) is arranged to extend along a front-to-rear direction of the vessel body 2. The vessel body 2 is operated to travel in a traveling direction shown by an arrow F.

A surge tank 20 and an intercooler 21 connected to each other are disposed at the left side of the engine 5. A forced-induction system (turbocharger) 22 is disposed at the rear side of the engine 5. The turbocharger 22 is operable to send compressed intake air to the engine 5. An air cleaner 24 is disposed at the front side of the engine 5. Air that passes through the air cleaner 24 is introduced to the forced-induction system 22 via a pipe 23.

An exhaust-air outlet port of an exhaust manifold (not shown) is connected to a turbine portion of the forced-induction system 22. The intercooler 21 is connected with a compressor portion of the forced-induction system 22 via a pipe 25. The surge tank 20 is connected with the intercooler 21 via a pipe 26.

In the engine 5, air introduced through the air cleaner 24 is supplied to the forced-induction system 22 via the pipe 23, and is compressed in the compressor portion. The compressed air is then supplied to the intercooler 21 via the pipe 25, and is cooled there.

Thereafter, the compressed air is supplied to the surge tank 20. The exhaust air that has rotated the turbine of the forced-induction system 22 is discharged to a water muffler 30 via a first exhaust pipe 27, a back-flow prevention apparatus 28, and a second exhaust pipe 29. Further, the exhaust air passes through an air-and-water discharge pipe 31, and then is discharged to the water flow ejected by the water-jet pump 7.

An engine-speed sensor (not shown) for detecting an engine speed, and a throttle-opening sensor (not shown) for detecting an opening degree of the throttle valve are provided in the engine 5. In addition, a boost pressure sensor (not shown) for detecting the boost pressure is arranged in the forced-induction system 22. The engine-speed sensor, the throttle-opening sensor, the boost pressure sensor are connected to the ECU 19, and detection signals from these sensors are inputted into the ECU 19.

Figure 1:
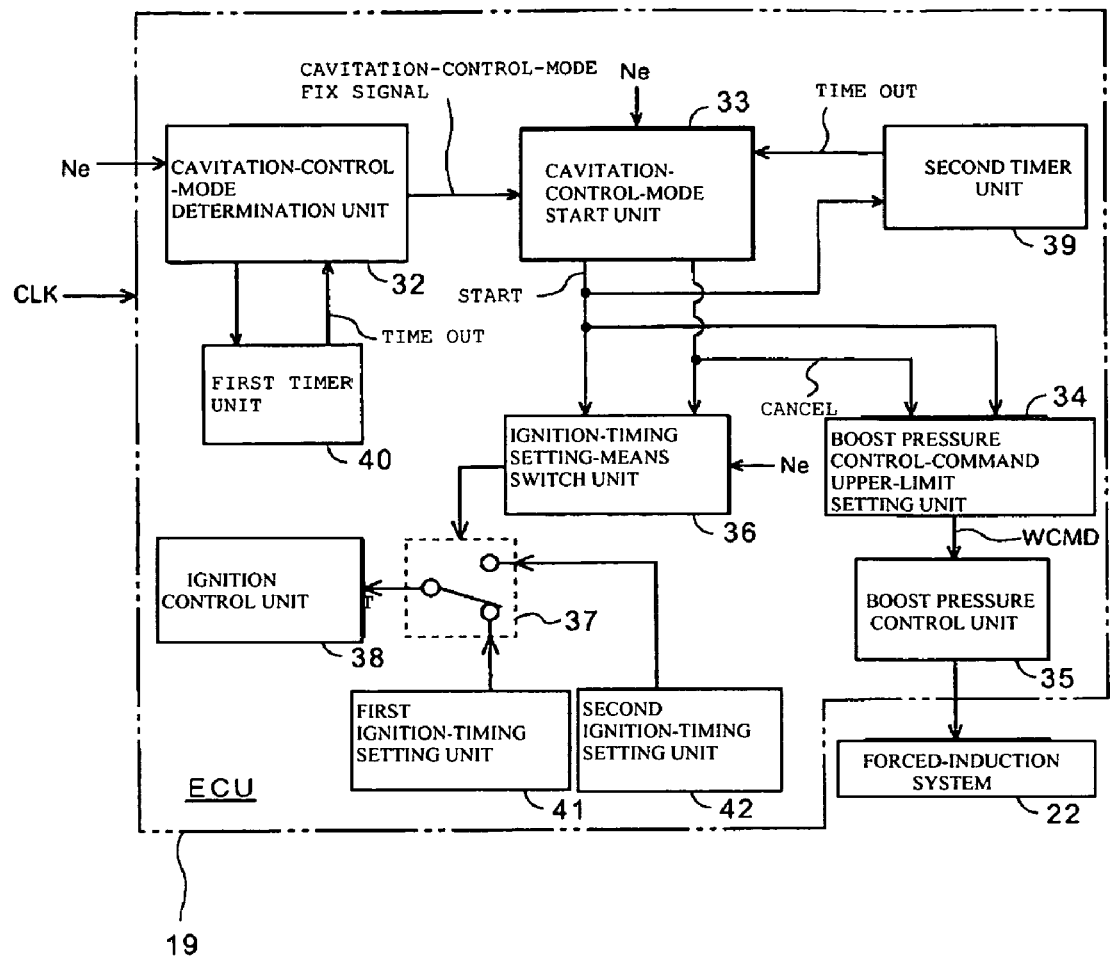
FIG. 1 is a block diagram illustrating principal functions of an engine control system for a jet-propulsion boat according to an illustrative embodiment of the present invention.

FIG. 1 is a block diagram illustrating principal functions of the ECU 19. A cavitation-control-mode determination unit (start-preparation detection unit) 32 determines whether an engine speed Ne that is less than or equal to a second engine speed Ne2 (for example, 3200 rpm) is not maintained for a first predetermine time period T1 (for example, 3 seconds).

A first timer unit 40 determines whether such an engine speed Ne is maintained for the first predetermined time period T1. The first timer unit 40 measures the first predetermined time period T1 by counting the clock pulse CLK of a microcomputer included in the ECU 19. The first timer unit 40 starts a measurement when the cavitation-control-mode determination unit 32 outputs a mode-determination start command.

The first timer unit 40 inputs a time-out signal (TIME OUT) into the cavitation-control-mode determination unit 32 when the first predetermined time period T1 has been measured. When the TIME OUT is inputted, the cavitation-control-mode determination unit 32 gives a positive determination result, and inputs a cavitation-control-mode fix signal into a cavitation-control-mode start unit 33.

The cavitation-control-mode start unit 33 determines whether an engine speed Ne exceeds a second engine speed Ne2. When the determination result is positive, the cavitation-control-mode start unit 33 outputs a cavitation-control-mode start command. In response to an input of the cavitation-control-mode start signal, a boost pressure control-command upper-limit setting unit 34 lowers a boost pressure control-command upper-limit value from a value for the normal sailing operation down to a value for a startup operation.

For example, the boost pressure control-command upper-limit setting unit 34 sets the boost pressure control-command upper-limit value from 99% for the normal sailing operation down to 70% for a startup operation.

A waste-gate passage is formed in the forced-induction system 22 so as to bypass a turbine chamber. When the actual boost pressure PC exceeds a target boost pressure POBJ, a waste-gate valve (boost pressure control valve) is opened. A boost pressure control command WCMD is inputted into the boost pressure control unit 35. The boost pressure control command WCMD of the forced-induction system 22 is limited to this boost pressure control-command upper-limit value for the startup operation.

In a response to an input of a cavitation-control-mode start command, the ignition-timing switching unit 36 determines whether the engine speed Ne is greater than or equal to the second engine speed Ne2. When the determination result is positive, the ignition-timing switching unit 36 gives a switch command to a switch 37 so as to switch from a first ignition-timing setting unit 41 to a second ignition-timing setting unit 42. The first ignition-timing setting unit 41 is used when the engine 5 is running normally while the second ignition-timing setting unit 42 is used when the vessel is starting.

The second ignition-timing setting unit 42 retards the ignition timing when the engine speed Ne is in a range greater than or equal to a first engine speed Ne1 (which is set at a value greater than or equal to an engine speed $Ne_{max}$ at which the maximum engine output is generated, for example, at 6500 rpm). This is the point that differentiates the second ignition-timing setting unit 42 from the first ignition-timing setting unit 41. Each of the first ignition-timing setting unit 41 and the second ignition-timing setting unit 42 can be provided in a form of a map, in which the relationship between the engine speed and the ignition timing is defined.

The ignition control unit 38 controls the ignition timing in accordance with the settings provided by the first ignition-timing setting unit 41 or by the second ignition-timing setting unit 42. While the second ignition-timing setting unit 42 is selected, an engine speed Ne that is greater than or equal to the first engine speed Ne1 makes the ignition control unit 38 retard the ignition timing in accordance with the setting provided by the second ignition-timing setting unit 42. The ignition control unit 38 is operated to perform ignition in accordance with the retarded ignition timing.

A second timer unit 39 measures a second predetermined time period T2 (for example, 1 second) when a cavitation-control-mode start command is issued. After the second predetermined time period T2 is measured, the second timer unit 39 inputs a TIME OUT into the cavitation-control-mode start unit 33. Upon receipt of the TIME OUT, the cavitation-control-mode start unit 33 inputs a cavitation-control-mode cancel signal into the ignition-timing switching unit 36 and the boost pressure control-command upper-limit setting unit 34.

Upon receipt of the cavitation-control-mode cancel signal, the boost pressure control-command upper-limit setting unit 34 changes the boost pressure control-command upper-limit value back to the one for the normal sailing operation. In addition, upon receipt of the cavitation-control-mode cancel signal, the ignition-timing switching unit 36 switches from the second ignition-timing setting unit 42 to the first ignition-timing setting unit 41. In other words, the ignition-timing switching unit 36 switches the map to the one for the normal sailing operation.

Figure 4:
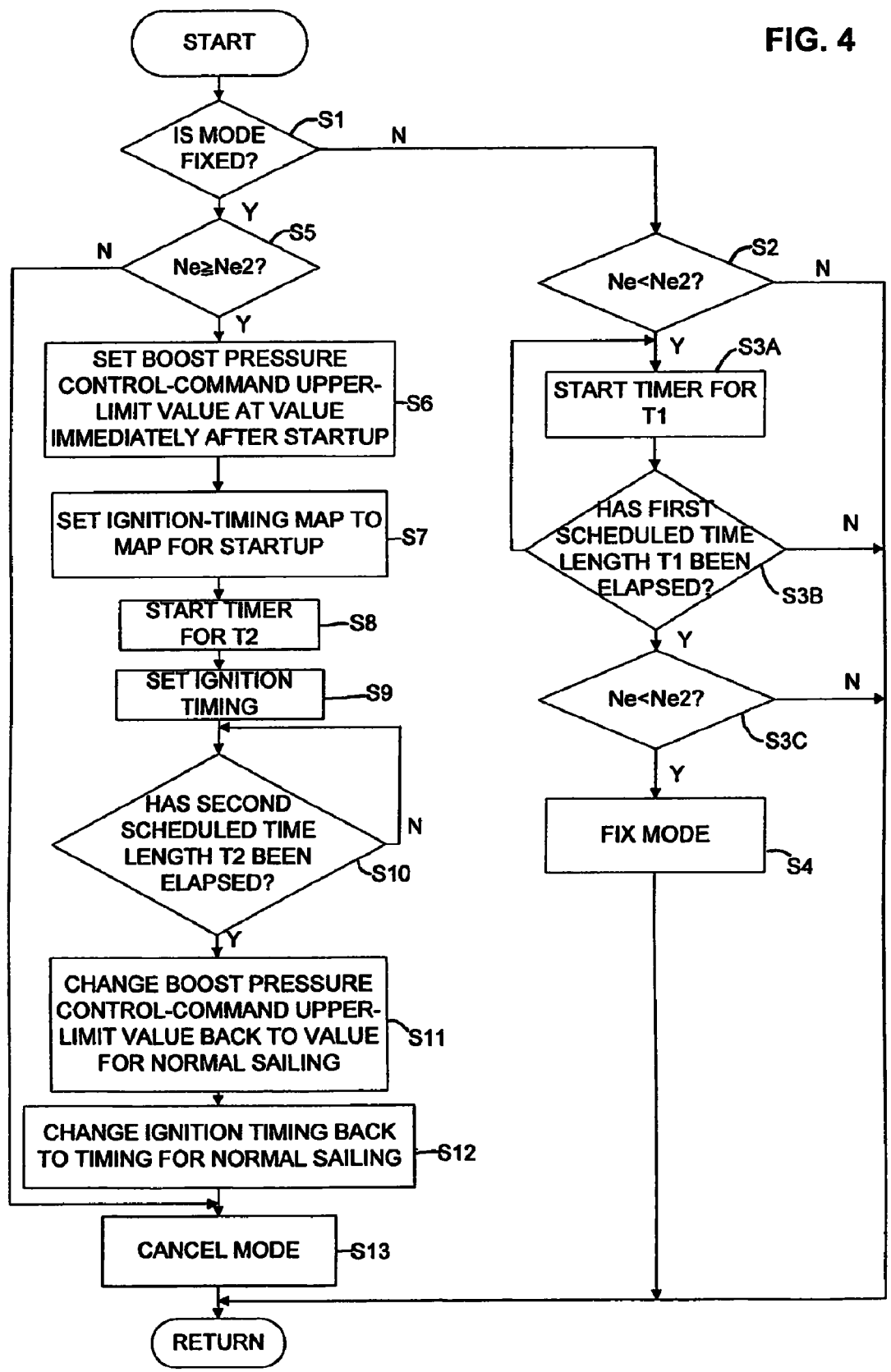
FIG. 4 is a flowchart illustrating principal processing of the engine control system (method of controlling the engine) for a jet-propulsion boat according to the illustrative embodiment of the present invention.

FIG. 4 is a flowchart illustrating the principal processing performed by the ECU 19. In step S1, a determination is made as to whether the cavitation-control mode for preventing cavitation from occurring is fixed. Under the cavitation-control mode, when the engine speed Ne is greater than or equal to the first engine speed Ne1 that is set at a value greater than or equal to the engine speed at which the maximum output is generated (6500 rpm), the ignition timing of the engine 5 is retarded to lower down the output of the engine 5. Accordingly, the occurrence of cavitation can be prevented.

When the cavitation-control mode is not fixed, the operational flow proceeds to step S2 to determine whether the engine speed Ne is slower than the second engine speed Ne2 (3200 rpm). When the engine speed Ne is faster than the second engine speed Ne2, the cavitation-control mode is not fixed, and the operational flow will depart from the processing illustrated in this flowchart of FIG. 4.

Conversely, when the engine speed Ne is less than the second engine speed Ne2, the operational flow proceeds to step S3A for starting the first timer unit 40. The first predetermined time period T1 is, for example, 3 seconds. In step S3B, a determination is made as to whether the first predetermined time period T1 has passed, that is, whether the first timer unit 40 has timed out. If the first predetermined time period T1 has passed, the operational flow proceeds to step S3C for determining whether the engine speed Ne is less than the second engine speed Ne2.

This step S3C is provided because there may be a case where a change occurs in the engine speed Ne before the first predetermined time period T1 is passed. When the determination result in step S3C is positive, it is determined that the engine speed Ne is less than the second engine speed Ne2 for the first predetermined time period T1.

Accordingly, the operational flow proceeds to step S4, and the cavitation-control mode is fixed. When the determination result in step S3C is negative, the operational flow skips step S4, and the cavitation-control mode is not fixed.

Once the cavitation-control mode is fixed, the operational flow proceeds to step S5 to determine whether the engine speed Ne is faster than or equal to the second engine speed Ne2. When the engine speed Ne is slower than the second engine speed Ne2, it is not necessary to execute the cavitation-control mode. Accordingly, the operational flow will depart from the processing illustrated in this flowchart of FIG. 4.

When the engine speed Ne is faster than the second engine speed Ne2, that is, when the engine speed Ne is raised up to a speed that is greater than or equal to the second engine speed Ne2 after the cavitation-control mode is fixed, the operational flow proceeds to step S6 for setting the boost pressure control-command upper-limit value at the value for the startup operation, which is lower than a value for the normal sailing operation. The boost pressure control-command upper-limit value for the normal sailing operation is set, for example, at 99%; while the boost pressure control-command upper-limit value for the startup operation is set, for example, at 70%.

In step S7, the ignition-timing map for the normal sailing operation (i.e., the first ignition-timing setting unit 41) is switched to the ignition-timing map for the startup (i.e., the second ignition-timing setting unit 42). Unlike the ignition-timing map for the normal sailing operation, in the ignition-timing map for the startup operation, the engine speed Ne is set so as to retard the ignition timing in a range of the engine speed Ne that is greater than or equal to the first engine speed Ne1 for the purpose of lowering the engine output.

In step S8, the second timer unit 39 for measuring the second predetermined time period T2 is started. The second predetermined time period T2 is set, for example, at 1 second. The second predetermined time period T2 is set at a time length long enough to raise the speed of the jet-propulsion boat up to a speed that eliminates the possibility of the occurrence of cavitation. Therefore, the second predetermined time period T2 does not have to be 1 second. Nevertheless, the second predetermined time period T2 is preferably set at a range from 1 second to 2 seconds, approximately.

In step S9, the ignition timing is set with reference to the ignition-map for the startup (i.e., the second ignition-timing setting unit 42). Accordingly, the ignition timing is retarded if the engine speed Ne is raised up to be greater than or equal to the first engine speed Ne1 (which is set to be greater than or equal to the engine speed $Ne_{max}$ for generating the maximum output) before the second predetermined time period T2 is elapsed.

In step S10, a determination is made as to whether the second predetermined time period T2 has been elapsed. If the second predetermined time period T2 has been elapsed, the operational flow proceeds to step S11 for changing the boost pressure control-command upper-limit value back to that for the normal sailing operation. In step S12, the ignition-timing map for the startup operation (i.e., the second ignition-timing setting unit 42) is changed back to that for the normal sailing operation (i.e., the first ignition-timing setting unit 41). In step S13, the cavitation-control mode is cancelled.

Next, the operation based on the aforementioned flowchart is described with reference to a timing chart.

Figure 5:
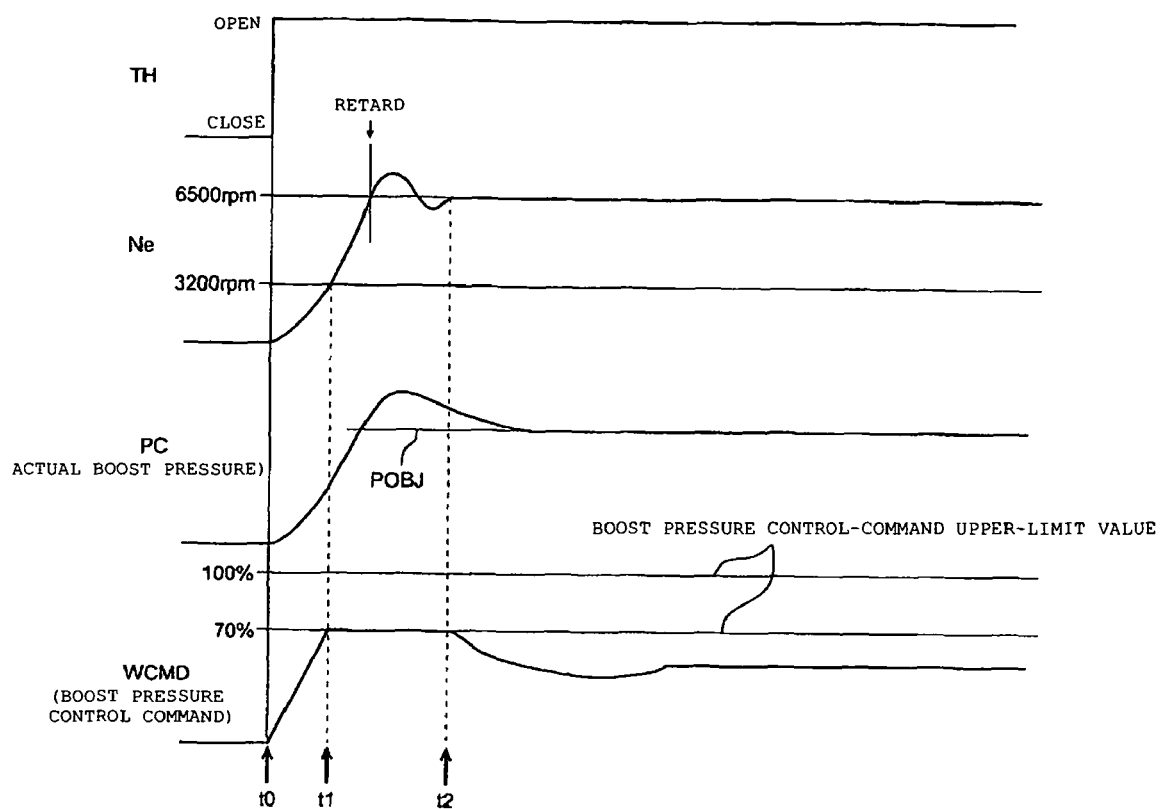
FIG. 5 is a timing chart for control, executed at the startup, of the ignition timing and of a boost pressure control-command upper-limit value.

FIG. 5 is a timing chart for the controlling, executed at the starting, the ignition timing and the boost pressure control-command upper-limit value. FIG. 5 shows that opening the throttle valve at a timing t0 makes the throttle-opening signal TH rise up. When the throttle valve is opened, the engine speed Ne accelerates. With the acceleration of the engine speed Ne, the actual boost pressure PC rises up.

A reference line POBJ in FIG. 5 represents a target boost pressure. When it takes equal to or longer than 3 seconds for the engine speed Ne to rise up to the second engine speed Ne2 of 3200 rpm (t1–t0), it is detected that the vessel is preparing for the startup operation, and the cavitation-control mode is fixed. Consequently, at the moment when the engine speed Ne exceeds 3200 rpm, a time length referred to as the ignition-timing switch time is started. The ignition-timing switch time (t2–t1) herein is set at 1 second.

When the engine speed Ne rises up to the first engine speed Ne1 (6500 rpm) within this 1 second, the ignition-timing map is switched to the one for the startup operation (the second ignition-time setting unit 42), and thus, the ignition timing is retarded. It may be noted that the distance between the timing t0 and the timing t1 is shown in FIG. 5 with a deliberately shortened time axis for the sake of simplicity.

Along with the increase of the engine speed Ne, the boost pressure control command WCMD rises up to the boost pressure control-command upper-limit value (70%). After the fixing of the cavitation-control mode, an engine speed Ne that exceeds the second engine speed Ne2 causes the boost pressure control-command upper-limit value to be set at the value for the startup operation (70%), which is less than the value for the normal sailing operation (99%).

The boost pressure control command WCMD is limited below this boost pressure control-command upper-limit value for the startup operation. Hence, the rising of the actual boost pressure is stopped. When 1 second that is a time length corresponding to the ignition-timing switch time has been elapsed by the timing t2, the boost pressure control-command upper-limit value returns to the value for the normal sailing operation. Accordingly, the actual boost pressure drops down and makes a steady line along the target boost pressure POBJ.

FIG. 6 illustrates a relationship between the engine output and the ignition timing under the cavitation-control mode according to the illustrative embodiment of the present invention. In FIG. 6, a horizontal axis (X-axis) represents an engine speed Ne, while a vertical axis (Y-axis) represents an engine output and an ignition timing. FIG. 6 shows that the engine output increases as the engine speed accelerates.

Under the cavitation-control mode, the ignition timing is controlled in a normal manner based on the engine speed Ne, the throttle opening degree, the engine temperature, and the like until the engine output rises up to the maximum level (that is, when the engine speed Ne is not faster than the first engine speed Ne1, that is set at a speed greater than or equal to the engine speed $Ne_{max}$ for generating the maximum output).

In addition, since the second ignition-timing setting unit 42 for the startup is selected during the cavitation-control mode, the engine speed Ne that exceeds the first engine speed Ne1 (which is set to be greater than or equal to the engine speed $Ne_{max}$ for generating the maximum output) causes the ignition timing to be switched from the normal-control-mode ignition timing to the cavitation-control-mode retarded ignition timing.

When it is not detected that the vessel is preparing for the starting operation, and thus the cavitation-control mode is not fixed, the speed of the engine 5 is accelerating in a state for the normal sailing operation. Accordingly, the normal-control mode ignition timing is employed even when the engine speed Ne is greater than or equal to the first engine speed Ne1.

As has been described with reference to FIGS. 4 through 6, the ignition timing is retarded to lower the engine output in this embodiment. In addition, the engine output is lowered by retarding the ignition timing and also by setting the boost pressure control-command upper-limit value at the value for the startup that is lower than a value for a normal sailing operation. Accordingly, the prevention of cavitation can be achieved.

It may be noted that, although the lowering of the engine output is achieved by retarding the ignition timing, the acceleration performance can be kept at a favorable level since the engine speed Ne is set at the first engine speed Ne1, that is, at the engine speed $Ne_{max}$ for generating the maximum output.

Once the cavitation-control mode is cancelled, the ignition timing returns to the first ignition-timing setting unit 41, and the retarding is stopped thereby increasing an engine output. In addition, since the actual boost pressure is high, a high engine output is maintained for a certain time period. Moreover, the turbine rotates at a high speed and the actual boost pressure PC is higher than the target boost pressure POBJ.

Accordingly, after the canceling of the cavitation-control mode, the actual boost pressure PC can rise up to the target boost pressure POBJ without any turbo lag. Since no turbo lag occurs even after the cavitation-control mode is cancelled, the acceleration performance can be maintained at a favorable level.

Now, the ignition timing is retarded only with the engine speed Ne that reaches or exceeds the engine speed $Ne_{max}$ for generating the maximum output, or the engine speed that reaches or exceeds the speed at the output peak. Accordingly, while the engine speed is within a range where cavitation is unlikely to occur, the acceleration in the normal way can be achieved.

Incidentally, like the jet-propulsion boat equipped with a forced-induction system, a jet-propulsion boat equipped with a naturally-aspirated engine including no forced-induction system, can also have similar advantageous effects of the present invention. That is, in the jet-propulsion boat with no forced-induction system, the prevention of cavitation can be achieved by retarding the ignition timing when the engine speed is faster than the speed at the output peak. Moreover, the acceleration in the normal way can be also achieved when the engine speed is within a range where cavitation is unlikely to occur.

The present invention has been described based on the illustrative embodiment, but the above-described embodiment is not the only form to carry out the present invention. Various modifications can be made without departing from the scope of claims.

For example, the first engine speed Ne1, the second engine speed Ne2, the first predetermined time period T1, and the second predetermined time period T2 can be changed as needed. In addition, the description of the above embodiment is based on an engine control system for a jet-propulsion boat equipped with an engine with a forced-induction system, but the present invention can be implemented similarly with an engine control system for a jet-propulsion boat equipped with an engine with no forced-induction system, except in a case to control the boost pressure control-command upper-limit value to lower it down to a value smaller than the normal value.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An engine control system for a jet-propulsion boat, said engine control system comprising:
    a first ignition-timing setting unit for setting a first engine ignition timing map for use during non-startup sailing operation of the jet-propulsion boat;
    a second ignition-timing setting unit for setting a second engine ignition timing map for use during starting of an engine of the jet-propulsion boat;
    a start-preparation detection unit for detecting an engine state in which a first detected engine speed is maintained for a first predetermined time period or longer at an amount less than or equal to a predetermined startup indicating engine speed;
    and an ignition-timing switching unit for switching, during the detected engine state of the engine, an active engine ignition timing map from the first engine ignition timing map to the second engine ignition timing map when a second detected engine speed is greater than or equal to the predetermined startup indicating engine speed, wherein the second engine ignition timing map retards the ignition timing when a third detected engine speed is greater than or equal to a predetermined maximum output engine speed.

2. The engine control system for a jet-propulsion boat according to claim 1, wherein the ignition-timing switching unit is operable to switch the active engine ignition timing map before completion of a predetermined time period after detection of the detected engine state of the engine.

3. The engine control system for a jet-propulsion boat according to claim 1, wherein the predetermined maximum output engine speed is set at an engine speed greater than or equal to an engine speed at which a maximum engine output is generated.

4. The engine control system for a jet-propulsion boat according to claim 2, wherein the predetermined maximum output engine speed is set at an engine speed greater than or equal to an engine speed at which a maximum engine output is generated.

5. The engine control system for a jet-propulsion boat according to claim 1, further comprising:
a forced-induction system and a boost pressure control valve both arranged in an exhaust system of the engine;
wherein when the ignition-timing switching unit is operated to switch the active engine ignition timing map to the second engine ignition timing map set by the second ignition-timing setting unit, a boost pressure control-command upper-limit value for opening said boost pressure control valve is set at a value smaller than a value for the non-startup sailing operation of the jet-propulsion boat.

6. The engine control system for a jet-propulsion boat according to claim 2, further comprising:
a forced-induction system and a boost pressure control valve both arranged in an exhaust system of the engine;
wherein when the ignition-timing switching unit is operated to switch the active engine ignition timing map to the second engine ignition timing map set by the second ignition-timing setting unit, a boost pressure control-command upper-limit value for opening said boost pressure control valve is set at a value smaller than a value for the non-startup sailing operation of the jet-propulsion boat.

7. The engine control system for a jet-propulsion boat according to claim 3, further comprising:
a forced-induction system and a boost pressure control valve both arranged in an exhaust system of the engine;
wherein when the ignition-timing switching unit is operated to switch the active engine ignition timing map to the second engine ignition timing map set by the second ignition-timing setting unit, a boost pressure control-command upper-limit value for opening said boost pressure control valve is set at a value smaller than a value for the non-startup sailing operation of the jet-propulsion boat.

8. The engine control system for a jet-propulsion boat according to claim 4, further comprising:
a forced-induction system and a boost pressure control valve both arranged in an exhaust system of the engine;
wherein when the ignition-timing switching unit is operated to switch the active engine ignition timing map to the second engine ignition timing map set by the second ignition-timing setting unit, a boost pressure control-command upper-limit value for opening said boost pressure control valve is set at a value smaller than a value for the non-startup sailing operation of the jet-propulsion boat.

9. A jet-propulsion boat comprising a dry sump four cycle engine, and an engine control system for controlling an operation of said engine, said engine control system comprising:
a first ignition-timing setting unit for setting a first engine ignition timing map for use during non-startup sailing operation of the jet-propulsion boat;
a second ignition-timing setting unit for setting a second engine ignition timing map for use during starting of an engine of the jet-propulsion boat;
a start-preparation detection unit for detecting an engine state in which a first detected engine speed is maintained for a first predetermined time period or longer at an amount less than or equal to a predetermined startup indicating engine speed; and
an ignition-timing switching unit for switching, during the detected engine state of the engine, an active engine ignition timing map from the first engine ignition timing map to the second engine ignition timing map when a second detected engine speed is greater than or equal to the predetermined startup indicating engine speed, wherein the second engine ignition timing map retards the ignition timing when a third detected engine speed is greater than or equal to a predetermined maximum output engine speed.

10. A jet-propulsion boat according to claim 9, wherein the ignition-timing switching unit is operable to switch the active engine ignition timing map before completion of a predetermined time period after detection of the detected engine state of the engine.

11. A jet-propulsion boat according to claim 9, wherein the predetermined maximum output engine speed is set at an engine speed greater than or equal to an engine speed at which a maximum engine output is generated.

12. A jet-propulsion boat according to claim 10, wherein the predetermined maximum output engine speed is set at an engine speed greater than or equal to an engine speed at which a maximum engine output is generated.

13. A jet-propulsion boat according to claim 9, further comprising
a forced-induction system and a boost pressure control valve both arranged in an exhaust system of the engine;
wherein when the ignition-timing switching unit is operated to switch the active engine ignition timing map to the second engine ignition timing map set by the second ignition-timing setting unit, a boost pressure control-command upper-limit value for opening said boost pressure control valve is set at a value smaller than a value for the non-startup sailing operation of the jet-propulsion boat.

14. A jet-propulsion boat according to claim 10, further comprising:
a forced-induction system and a boost pressure control valve both arranged in an exhaust system of the engine;
wherein when the ignition-timing switching unit is operated to switch the active engine ignition timing map to the second engine ignition timing map set by the second ignition-timing setting unit, a boost pressure control-command upper-limit value for opening said boost pressure control valve is set at a value smaller than a value for the non-startup sailing operation of the jet-propulsion boat.

15. A jet-propulsion boat according to claim 11, further comprising:
a forced-induction system and a boost pressure control valve both arranged in an exhaust system of the engine;
wherein when the ignition-timing map switching unit is operated to switch the active engine ignition timing map to the second engine ignition timing map set by the second ignition-timing setting unit, a boost pressure control-command upper-limit value for opening said boost pressure control valve is set at a value smaller than a value for the non-startup sailing operation of the jet-propulsion boat.

16. A method of controlling an engine of a jet-propulsion boat, said method comprising the steps of
   setting a first engine ignition timing map for use during non-startup sailing operation of the jet-propulsion boat using a first ignition-timing setting unit;
   setting a second engine ignition timing map for use during starting of an engine of the jet-propulsion boat using a second ignition-timing setting unit;
   detecting an engine state of the engine based on a first detected engine speed being maintained for a first predetermined time period or longer at an amount less than or equal to a predetermined startup indicating engine speed, using a startup detection unit; and
   when a second detected engine speed is greater than or equal to the predetermined startup indicating engine speed during the detected startup period of the engine, switching an active engine ignition timing map from the first engine ignition-timing to the second engine ignition timing map using an ignition-timing switching unit.

17. A method of controlling an engine of a jet-propulsion boat according to claim 16, wherein the ignition-timing switching unit is operable to switch the active engine ignition timing map before completion of a predetermined time period after detection of the detected startup period of the engine.

18. A method of controlling an engine of a jet-propulsion boat according to claim 16, wherein the predetermined maximum output engine speed is set at an engine speed greater than or equal to an engine speed at which a maximum engine output is generated.

19. A method of controlling an engine of a jet-propulsion boat according to claim 17, wherein the predetermined maximum output engine speed is set at an engine speed greater than or equal to an engine speed at which a maximum engine output is generated.

20. A method of controlling an engine of a jet-propulsion boat according to claim 16, further comprising a step of:
   when the ignition-timing switching unit switches the active engine ignition timing map to the second engine ignition timing set by the second ignition-timing setting unit, setting a boost pressure control-command upper-limit value for opening a boost pressure control valve at a value less than a predetermined value at the non-startup sailing operation.

* * * * *